Patented Jan. 16, 1951

2,537,969

UNITED STATES PATENT OFFICE 2,537,969

PREPARATION OF POLYMERIZED METHYL METHACRYLATE SHEETS

John Lyman Chynoweth, New York, N. Y., and Glenn Edward Wintermute, Kearny, N. J., assignors to E. I. du Pont de Nemours & Company, Wilmington, Del., a corporation of Delaware No Drawing. Application May 20, 1949, Serial No. 94,508

6 Claims. (Cl. 18—58)

This invention relates to the preparation of polymerized methyl methacrylate sheets and, more particularly, to a process of casting flawless methyl methacrylate sheets.

In copending application Serial No. 94,509, filed of even date herewith in the name of Reuben T. Fields and entitled "Preparation of Synthetic Resin Sheets," assigned to the assignee of the instant application, there is disclosed a process of preparing synthetic resin sheets such as sheets of polymerized methyl methacrylate. The polymerized methyl methacrylate sheets are prepared by distributing liquid methyl methacrylate on the surface of a body of a substantially saturated aqueous salt solution having a specific gravity at least as great as polymerized methyl methacrylate and thereafter polymerizing said methyl methacrylate at a temperature between 0° C. and 80° C. This process is a radical departure from heretofore known techniques for casting methyl methacrylate sheets and, being well adapted for continuous operation which is not true of the previous techniques, it is a development of fundamental significance in the art.

By the process disclosed in the copending application both perfectly transparent sheets and hazy sheets of methyl methacrylate polymer may be produced free of bubbles and other major flaws. To obtain transparent sheets, an aqueous solution of either magnesium chloride or lithium chloride apparently must be used but the widest assortment of metal salts may be used in the aqueous solution if a certain amount of haze is permissible in the sheet. For many purposes these sheets may be considered flawless but it has been noted that in uses requiring optimum optical properties these sheets reveal a characteristic flaw which may best be described as a plurality of irregular lines radiating in random directions from the point where the liquid methyl methacrylate is distributed onto the surface of the body of aqueous salt solution. These optical imperfections are not readily seen upon visual inspection but are clearly revealed in a shadow-graph obtained by photographing the shadow pattern formed on a white screen by placing a light source on the opposite side of the sheet to be examined, from the screen.

An object of the present invention is to provide an improvement in the process of preparing polymerized methyl methacrylate sheets by casting on a body of an aqueous salt solution. A specific object is to provide an improvement in such process whereby the aforementioned optical imperfections in the cast sheets can be eliminated. Other objects will be apparent from the description of the invention given hereinafter.

The above objects are accomplished according to the present invention by the steps of adding water to liquid methyl methacrylate and thereafter distributing the methyl methacrylate on the surface of a body of a substantially saturated aqueous salt solution, the amount of water added to said methyl methacrylate being at least sufficient to saturate the methyl methacrylate 70% at the temperature thereof when it is distributed on the surface of the salt solution. This is an improvement in the process of the above Fields application wherein the methyl methacrylate is distributed on the surface of a body of a substantially saturated aqueous salt solution having a specific gravity at least as great as polymerized methyl methacrylate and thereafter polymerizing the methyl methacrylate at a temperature between 0°C. and 80° C., the temperature of the salt solution preferably being maintained at a temperature between —20° C. and 80° C.

The present invention largely resides in the discovery that these optical imperfections in the cast sheets which show up as lines in a shadowgraph, seem to derive from the diffusion of water from the aqueous salt solution into the adjacent polymerizing liquid methyl methacrylate and the discovery that this diffusion of water can be halted or, in any event, formation of the optical imperfections can be prevented by adding sufficient water to the liquid methyl methacrylate so that it is at least 70% saturated at the temperature at which it is to be distributed on the aqueous salt solution. In commercial practice, it is customary to redistill methyl methacrylate monomer before using it in a casting process and such redistilled methyl methacrylate monomer invariably contains a very low proportion of water, less than 0.1%. Further, the monomer ordinarily contains practically no water so that the step of adding water to saturate the methyl methacrylate to 70% is always necessary. It is preferred that the methyl methacrylate be 100% saturated at the temperature at which it is to be distributed on the aqueous salt solution but it has been found this is not necessary and 70% saturation serves to eliminate the optical imperfections herein mentioned.

In a preferred form particularly adapted for continuous operation, the invention comprises, in the process of preparing a polymerized methyl methacrylate sheets by distributing a syrup of methyl methacrylate having a viscosity between 0.5 and 25 poises, on the surface of a body of a substantially saturated aqueous solution of a salt from the group consisting of magnesium chloride and lithium chloride, and thereafter polymerizing the methyl methacrylate by subjecting it to actinic light at a temperature between 0° C. and 40° C., the salt solution being maintained at a temperature between 0° C. and 30° C., the steps of adding water to the syrup of methyl methacrylate and thereafter distributing the syrup at a temperature between 0° C. and 20° C. on the surface of the salt solution, the amount of water added to the liquid methyl methacrylate being at least sufficient to saturate the methyl methacrylate 70% at the temperature thereof when it is distributed on the surface of the salt solution.

The following examples wherein all proportions are given by weight unless otherwise stated, illustrate specific embodiments of the invention:

Example I

Lithium chloride was dissolved in a quantity of distilled water by heating to approximately 70° C. with agitation. The resulting salt solution was saturated at approximately 50° C. and had a specific gravity of about 1.3 at 50° C. In a similar manner an aqueous solution of hydrated magnesium chloride ($MgCl_2.6H_2O$) was prepared, this solution being saturated at approximately 50° C. and having a specific gravity of about 1.3 at 50° C. Each of the salt solutions was used to fill two 1-gallon bottles approximately one-third full. Thereafter, methyl methacrylate monomer containing less than 0.1% of water, based upon the weight of monomer, was catalyzed with 0.1% of benzoyl peroxide. This monomer was then distributed on to the surface of one of each of the two different salt solutions in a quantity sufficient to give a casting approximately 1/8" in thickness. To another quantity of the methyl methacrylate monomer was added 1.6% of distilled water and the monomer was agitated at a temperature of 65° C. until the water was completely dissolved therein. This monomer was as a result substantially saturated 70% with water at 65° C. The monomer was then catalyzed with 0.1% of benzoyl peroxide and poured on the surface of each of the two different salt solutions contained in the other two 1-gallon bottles in a quantity sufficient to give a casting approximately 1/8" in thickness.

All four bottles were flushed with nitrogen, tightly stoppered, and then placed in a circulating air oven maintained at 70° C. Polymerization of the 1/8" thick sheet castings was substantially complete after three hours. All four of the castings were clear and free of bubbles.

Shadow-graphs of all four of the cast sheets were made and observed. These shadow-graphs were obtained by photographing the shadow pattern produced on a white screen placed 4' behind the cast sheet, the shadow being formed by placing a point source of light 15 feet on the opposite side of the cast sheet. The shadow-graphs of the cast sheets produced from the methyl methacrylate monomer containing less than 0.1% of water, show irregular lines radiating in random directions from the point of pour, such lines representing optical imperfections in the cast sheet which are not readily seen simply by visual inspection. By contrast, the cast sheets obtained by polymerization of the substantially water-saturated monomer gave shadow-graphs completely devoid of such linear irregularities.

Example II

The procedure outlined in Example I was repeated except that the following salts were dissolved in distilled water: sodium chloride, magnesium sulfate, calcium chloride and zinc sulfate. Each of the salt solutions was saturated at approximately 50° C. Each of the salt solutions was then poured into two 1-gallon bottles so that each of the bottles was approximately 1/3 full. Methyl methacrylate syrup having a viscosity of 15 poises and containing less than 0.1% of water was distributed onto the surface of one of each of the different salt solutions in a quantity sufficient to give a casting approximately 1/8 inch in thickness. Another quantity of the same methyl methacrylate syrup was agitated with 1.0% of water at 50° C. to give a syrup 83% saturated. The syrup was in turn distributed onto the surface of each one of the different salt solutions contained in the other gallon bottles in a quantity sufficient to give a casting approximately 1/8 inch in thickness. In each case, the methyl methacrylate syrup was catalyzed with 0.1% of alpha, alpha' azobis (alpha, gamma dimethyl valeronitrile).

The bottles were flushed with nitrogen, tightly stoppered, and placed in a circulating air oven maintained at about 50° C. Polymerization was substantially complete after about two and one-half hours. All of the resulting cast sheets were free of bubbles but the surface of each sheet adjacent to the salt solution was somewhat hazy.

Shadow-graphs of all the sheets prepared from the syrup containing less than 0.1% of water, showed irregular lines radiating from the point of pour. These irregular lines were not apparent in the sheets prepared from the 83% saturated syrup.

Example III

Hydrated magnesium chloride was dissolved in a quantity of distilled water at room temperature. The concentration of the salt solution was regulated so that it was saturated at approximately 15° C., and it had a specific gravity of about 1.3 at 15° C. The salt solution was poured into a one-gallon bottle so that the bottle was approximately 1/3 full. Thereafter, a syrup of methyl methacrylate having a viscosity of about 10 poises and containing less than 0.1% of water, based upon the weight of syrup, was distributed onto the surface of the salt solution in a quantity sufficient to give a casting approximately 1/8 inch in thickness. The syrup was catalyzed with 0.3% of benzoin, based upon the weight of syrup.

The bottle was flushed with nitrogen and placed in a cooling water bath maintained at about 15° C., and the syrup was irradiated with a bank of five BL–360 lights for three hours. The resulting cast sheet was clear and free of bubbles.

The above procedure was repeated except that 0.8% of water, based upon the weight of syrup, was dissolved at a temperature of 15° C. in a quantity of the syrup from the same batch as used above, and this 76% water-saturated syrup was photopolymerized in accordance with the same conditions given above. The resulting cast sheet was clear and free of bubbles.

Observation of the shadow-graphs of the two sheets showed the appearance of irregular radiant lines in the shadow-graph of the sheet prepared from syrup containing less than 0.1% of water, whereas the shadow-graph of the sheeting prepared from the 76% water-saturated syrup was devoid of these irregular lines.

Example IV

The following example illustrates the present invention as applied to a continuous process for polymerizing methyl methacrylate sheeting on the surface of an aqueous salt solution.

An aqueous solution of magnesium chloride was prepared so as to produce an aqueous salt solution which was saturated at about 10° C., and had a specific gravity of about 1.3 at 10° C. This solution of magnesium chloride was poured into a Monel metal tray 18 inches wide by 6 feet long by 1½ inches in depth, until the solution rose to a depth of ¾ of an inch.

A syrup of methyl methacrylate having a viscosity of about 15 poises and containing less than 0.1% of water, based upon the weight of syrup, was catalyzed with 0.1% of benzoin. Thereafter, the syrup was distributed onto the surface of the magnesium chloride solution through a small tube at the rate of 0.1 gallon per hour. Two parallel belts fabricated from polytetrafluoroethylene, 0.035 inch in thickness by 1½ inches in width, spaced 18 inches apart, were moved concurrently with the syrup as a means of confining the syrup so that a sheet 18 inches in width would be formed. The belts, which were immersed into the salt solution to a depth of about ½ inch, were moving at a speed of about 1 foot per hour. The adjacent salt solution was circulated concurrently with the syrup at approximately the same rate as the syrup, and was cooled and filtered in a continuous fashion. Under the foregoing conditions a polymeric sheet having a caliper of about ⅛ inch was formed.

The Monel metal tray was covered with a sheet of glass which permitted the maintenance of an atmosphere of nitrogen above the surface of the polymerizing mass. The salt solution was maintained at a temperature of 15° C. by a cooling jacket beneath the Monel tray. The inlet temperature of the syrup was about 15° C., and during polymerization the temperature of the polymerizing layer rose to a maximum of about 40° C. As the source of polymerization energy, a bank of twenty BL-360 lights (BL-360 fluorescent lights manufactured by the General Electric Co. produce "black light" of maximum intensity at approximately 3600 Angstroms wave length) was suspended above the casting tray. Upon emerging from the irradiated zone, the polymerized methyl methacrylate sheeting was substantially completely polymerized. The sheeting produced was of particularly high clarity with smooth surfaces and was free of bubbles.

The above procedure was repeated using a syrup of methyl methacrylate having a viscosity of about 15 poises and containing 0.8% of water, based upon the weight of syrup, the syrup being catalyzed with 0.1% by weight of benzoin. This syrup was 80% water-saturated at 15° C., the inlet temperature of the syrup. The resulting sheeting was of high clarity with smooth surfaces and was free of bubbles.

Shadow-graphs of the sheeting produced from the syrup containing less than 0.1% of water, showed irregular lines running substantially parallel to the direction of movement of the sheeting, these lines representing optical imperfections on the surface of the sheeting. By contrast, a shadow-graph of the sheeting prepared from the water-saturated syrup was completely devoid of the irregular lines present in the shadow-graph of the sheeting produced from the syrup containing less than 0.1% of water.

The above examples are merely illustrative and the present invention broadly comprises, in the process of preparing polymerized methyl methacrylate sheets by distributing liquid methyl methacrylate on a body of a saturated aqueous salt solution and thereafter polymerizing the methyl methacrylate, the steps of adding water to the liquid methyl methacrylate and then distributing the liquid methyl methacrylate on the body of aqueous salt solution, the amount of water added to the methyl methacrylate being at least sufficient to saturate the methyl methacrylate 70% at the temperature of the methyl methacrylate when distributed on the salt solution.

The primary object of this invention is to prevent the formation of the previously mentioned optical imperfections in cast sheets made by the process of the Fields application. It has been discovered that to accomplish this according to the present invention the critical period is during the early stages after the liquid methyl methacrylate has been distributed on the surface of the salt solution and that the liquid methyl methacrylate should contain sufficient water to approach saturation during that period, this, of course, necessitating a consideration of the temperature of the liquid methyl methacrylate since the degree of saturation with a given quantity of water will decrease as the temperature of the methyl methacrylate rises. Under normal operating conditions the rise in the temperature of the polymerizing methyl methacrylate is invariably relatively gradual so that appreciable polymerization takes place as the temperature increases. For this reason, an amount of water sufficient to saturate the methyl methacrylate at the temperature thereof when it is distributed on the surface of the salt solution is sufficient even though the temperature of the polymerizing layer of methyl methacrylate may eventually rise conceivably higher than the initial temperature.

Conceivably, the temperature of the liquid methyl methacrylate might be forced up very rapidly at the start of the process with the result that the degree of saturation would fall well below 70% before appreciable polymerization could take place. Such procedure would be directly contrary to normal accepted practices and would have no over-all advantages insofar as known. Actually, it would be substantially impossible to encounter difficulties of this type if the temperature of the salt solution did not exceed the temperature of the liquid methyl methacrylate by more than 20° C. at the start of the process. There is no compelling reason why there should be any greater difference in temperature at the start of the process but, if a greater difference in temperature were found to be advantageous, the amount of water added to the liquid methyl methacrylate may be increased up to the point of 100% saturation to offset the danger of having too little water present in the methyl methacrylate.

It is preferred that the amount of water added should not exceed that required to saturate the liquid methyl methacrylate 100% at the temperature it will be distributed on the salt solution. Water in excess of this amount is not actually inoperative since it will usually diffuse into the salt solution without any appreciable deleterious effect but, especially if a flawless transparent sheet is desired, this does involve a needless hazard and is not recommended. The minimum saturation of the methyl methacrylate of 70% is not sharply critical as lesser degrees of saturation will at least reduce the optical imperfections herein considered but it has been found where it is desirable to eliminate such imperfections completely, it is not safe to go appreciably below 70% saturation and it is preferred, as an additional safety factor, to saturate the methyl methacrylate at least 80%.

The process to which the present invention is applicable, is fully disclosed in said Fields application and the present invention is not concerned with the more specific details of that process. The salt solutions used are those of inorganic acids and include the widest assortment of water-soluble salts such as sodium chloride, bromide, iodide, and sulfate, potassium chloride, bromide, and sulfate, magnesium sulfate, calcium chloride, barium chloride, zinc sulfate and ammonium sulfate, as well as the two preferred salts, i. e., lithium chloride and magnesium chloride.

An obvious requirement of the salt solution is that it shall have a specific gravity at least as great as polymerized methyl methacrylate. Further, the salt solution and the methyl methacrylate must be substantially mutually insoluble and this latter requirement is fulfilled if the aqueous salt solution is a substantially saturated one.

Broadly, the process contemplates polymerizing the methyl methacrylate at any temperature within the range of 0° C. to 80° C. Polymerization may be effected either by thermal energy or actinic light. Photopolymerization is preferred since it lends itself so well to continuous operation and, in addition, gives improved control of the polymerization rate with resulting average molecular weight control of the polymer and polymerization at lower temperatures. The improvement of the present invention is particularly advantageous when the process is carried out by photopolymerization using a saturated magnesium chloride or lithium chloride aqueous solution maintained at a temperature between 0° C. and 30° C. with the liquid methyl methacrylate at a temperature between 0° C. and 20° C. at the start and saturated at least 80% with water, and the conditions regulated so that the polymerizing layer of methyl methacrylate does not exceed 40° C. at least until the polymerization has progressed substantially toward completion. The temperature of the methyl methacrylate layer in the latter stages of the polymerization, within reasonable limits, is not an important factor. Further to eliminate oxygen inhibition it is preferred that the atmosphere above the upper surface of the polymerizing layer be blanketed with an inert gas such as nitrogen or carbon dioxide, a known prior art expedient.

A polymerization catalyst will usually be mixed with the polymerizable liquid. Such catalysts and the proportions in which they are desirably used, are thoroughly discussed in the prior art. Photopolymerization catalysts are discussed in copending application Serial No. 655,013, filed March 16, 1946, in the name of L. R. Salisbury, and in U. S. Patents 2,367,660; 2,367,661; and 2,448,828 including the proportions in which they are conventionally used. Preferred photopolymerization catalysts include benzoin, benzoin methyl ether, benzoin ethyl ether, and various azo catalysts such as alpha,alpha′ azodiisobutyronitrile but any photopolymerization catalyst may be used in this invention.

The well-known thermal polymerization catalysts include benzoyl peroxide, lauroyl peroxide, acetyl benzoyl peroxide, diacetyl peroxide, tertiary butyl perbenzoate, and such azo catalysts as alpha,alpha′ azodiisobutyronitrile and alpha,- alpha′ azobis (alpha,gamma-dimethylvaleronitrile) and other azo compounds disclosed in copending application Serial No. 2551, filed January 15, 1948, now Patent No. 2,471,959, in the name of Madison Hunt.

The present invention contemplates adding to the liquid polymerizable compound various modifiers such as dye-stuffs, pigments, plasticizers, lubricants, pearlescent materials and the like to obtain desired characteristics in the finished sheet, according to well-known practices in the art. When photopolymerization is to be used, it is apparent that any additives or modifiers which would make the polymerizable liquid opaque to light would not be satisfactory although dark color castings can be readily produced by thermal polymerization.

The viscosity of the polymerizable liquid may vary between that of the monomer, in the neighborhood of 0.4 centipoises for methyl methacrylate to the viscosity of heavy syrups of about 40 poises. In general, particularly for continuous operation, the viscosity preferably should be between .5 and 25 poises, it being somewhat difficult to handle properly a highly viscous syrup while the use of a syrup, if not too viscous, instead of the monomer is advantageous since it reduces the time necessary to complete polymerization and, also, the amount of exothermic heat is less. Syrups of the polymerizable compound may be prepared either by dissolving polymer in monomer until the desired viscosity is reached or by polymerizing the monomer until the desired viscosity is reached, prior to distributing on the body of aqueous salt solutions.

The present invention is concerned only with the polymerization of methyl methacrylate and is not broadly applicable to liquid polymerizable compounds generally although it is believed that the presence of water would tend to reduce optical imperfections in sheets made by the herein considered process regardless of what specific polymerizable compound was employed. However, the present invention does contemplate the addition to the liquid methyl methacrylate, not only of conventional modifiers as mentioned above, but also minor proportions of other liquid polymerizable compounds such as styrene, various acrylates, methacrylates, ethacrylates, vinyl chloride and the like. Those skilled in the art will appreciate that such additions should be restricted to minor proportions as they obviously have a tendency to effect the degree of water-saturation of the methyl methacrylate.

The particular advantage of the present invention is that it provides a means of eliminating certain optical imperfections which have been invariably found heretofore in polymerized methyl methacrylate sheets obtained by polymerizing methyl methacrylate distributed on a substantially saturated aqueous salt solution. A further advantage is that the added cost and trouble in practicing this invention is substantially negligent and is manifestly far outweighed by the benefits deriving from it.

As many apparently widely different embodiments of this invention may be made without departing from the spirit and scope thereof; it is to be understood that the invention is not limited to the specific embodiments thereof except as defined in the appended claims.

The invention claimed is:

1. In the process of preparing polymerized methyl methacrylate sheets by distributing liquid methyl methacrylate on the surface of a body of a substantially saturated aqueous salt solution having a specific gravity at least as great as polymerized methyl methacrylate, and thereafter polymerizing said methyl methacrylate at a temperature between 0° C. and 80° C., the steps of adding water to said liquid methyl methacrylate and thereafter distributing said liquid methyl methacrylate on the surface of said body of aqueous salt solution, the amount of water added to said methyl methacrylate being at least sufficient to saturate said methyl methacrylate 70% at the temperature thereof when distributed on said surface.

2. Process as set forth in claim 1 wherein said aqueous salt solution is an aqueous solution of magnesium chloride.

3. Process as set forth in claim 1 wherein said aqueous salt solution is an aqueous solution of lithium chloride.

4. In the process of preparing polymerized methyl methacrylate sheets by distributing liquid methyl methacrylate on the surface of a body of a substantially saturated aqueous salt solution having a specific gravity at least as great as polymerized methyl methacrylate, and thereafter polymerizing said methyl methacrylate by subjecting same to actinic light at a temperature between 0° C. and 40° C., said salt solution being maintained at a temperature between 0° C. and 30° C., the steps of adding water to said liquid methyl methacrylate and thereafter distributing said methyl methacrylate at a temperature between 0° C. and 20° C. on the surface of said body of aqueous salt solution, the amount of water added to said methyl methacrylate being at least sufficient to saturate said methyl methacrylate 70% at the temperature thereof when distributed on said surface.

5. The process as set forth in claim 4 wherein said aqueous salt solution is an aqueous solution of magnesium chloride.

6. The process as set forth in claim 4 wherein said aqueous salt solution is an aqueous solution of lithium chloride.

JOHN LYMAN CHYNOWETH.
GLENN EDWARD WINTERMUTE.

REFERENCES CITED

The following references are of record in the file of this patent:

UNITED STATES PATENTS

| Number | Name | Date |
|---|---|---|
| 2,370,562 | Meunier | Feb. 27, 1945 |
| 2,447,140 | Shelton et al. | Aug. 17, 1948 |